United States Patent
Eiselt

(10) Patent No.: US 9,806,843 B2
(45) Date of Patent: Oct. 31, 2017

(54) METHOD AND DEVICE FOR CREATING A CONTROL CHANNEL IN AN OPTICAL TRANSMISSION SIGNAL AND METHOD AND DEVICE FOR EXTRACTING THE INFORMATION INCLUDED THEREIN

(71) Applicant: ADVA Optical Networking SE, Meiningen (DE)

(72) Inventor: Michael Eiselt, Kirchheim (DE)

(73) Assignee: Adva Optical Networking SE, Meiningen (DE)

( * ) Notice: Subject to any disclaimer, the term of this patent is extended or adjusted under 35 U.S.C. 154(b) by 0 days.

(21) Appl. No.: 15/089,840

(22) Filed: Apr. 4, 2016

(65) Prior Publication Data

US 2016/0301496 A1   Oct. 13, 2016

(30) Foreign Application Priority Data

Apr. 9, 2015 (EP) .................................... 15162994

(51) Int. Cl.
*H04B 10/00* (2013.01)
*H04J 14/02* (2006.01)
(Continued)

(52) U.S. Cl.
CPC ...... *H04J 14/0227* (2013.01); *H04B 10/0775* (2013.01); *H04B 10/27* (2013.01);
(Continued)

(58) Field of Classification Search
USPC ................................................. 398/192–198
See application file for complete search history.

(56) References Cited

U.S. PATENT DOCUMENTS

| 7,068,949 B2 * | 6/2006 | Jung ....................... H04J 14/02 372/29.011 |
| 8,306,419 B2 * | 11/2012 | Luk ..................... H04B 10/2587 398/195 |

(Continued)

FOREIGN PATENT DOCUMENTS

| CN | 102624479 A | 8/2012 |
| EP | 2773056 A1 | 9/2014 |

OTHER PUBLICATIONS

Roppelt et al., "Tuning Methods for Uncooled Low-Cost Tunable Lasers in WDM-PON," Optical Fiber communication Conference and Exposition and the National Fiber Optic Engineers Conference, 2011, pp. 1-1.

*Primary Examiner* — Agustin Bello
(74) *Attorney, Agent, or Firm* — The Webb Law Firm

(57) ABSTRACT

The invention relates to a method for creating a control channel in an optical transmission signal, wherein the optical transmission signal ($S_{DS,i}$, $S_{US,i}$) includes an optical carrier frequency component, a higher frequency modulation component carrying user information to be transported from a first end to a second end of an optical transmission link and a lower frequency modulation component carrying control information, the higher frequency modulation component realizing a user channel and the lower frequency modulation component realizing the control channel, and wherein the lower frequency modulation component is created by amplitude modulation. According to the invention, the lower frequency modulation component includes a binary digital pilot tone signal component which corresponds to a pilot tone signal having a predetermined pilot tone frequency ($f_i$).

20 Claims, 4 Drawing Sheets

(51) Int. Cl.
  *H04B 10/516*      (2013.01)
  *H04L 5/00*        (2006.01)
  *H04B 10/27*       (2013.01)
  *H04B 10/077*      (2013.01)

(52) U.S. Cl.
  CPC ...... *H04B 10/5161* (2013.01); *H04J 14/0272* (2013.01); *H04J 14/0276* (2013.01); *H04L 5/0048* (2013.01); *H04B 2210/075* (2013.01)

(56) References Cited

U.S. PATENT DOCUMENTS

| | | | |
|---|---|---|---|
| 9,231,724 B2 * | 1/2016 | Pachnicke | H04J 14/0227 |
| 2002/0154372 A1 * | 10/2002 | Chung | H04B 10/0775 |
| | | | 398/187 |
| 2003/0016413 A1 * | 1/2003 | Carrick | H04B 10/00 |
| | | | 398/79 |
| 2004/0005150 A1 * | 1/2004 | Takeshita | H04B 10/00 |
| | | | 398/32 |
| 2005/0286909 A1 * | 12/2005 | Kish, Jr. | B82Y 20/00 |
| | | | 398/196 |
| 2012/0251122 A1 * | 10/2012 | Grobe | H04J 14/0221 |
| | | | 398/95 |
| 2013/0251364 A1 * | 9/2013 | Pachnicke | H04J 14/0227 |
| | | | 398/32 |
| 2013/0336655 A1 * | 12/2013 | Grobe | H04J 14/0246 |
| | | | 398/67 |
| 2014/0247840 A1 | 9/2014 | Eiselt et al. | |
| 2016/0301496 A1 * | 10/2016 | Eiselt | H04J 14/0227 |

* cited by examiner

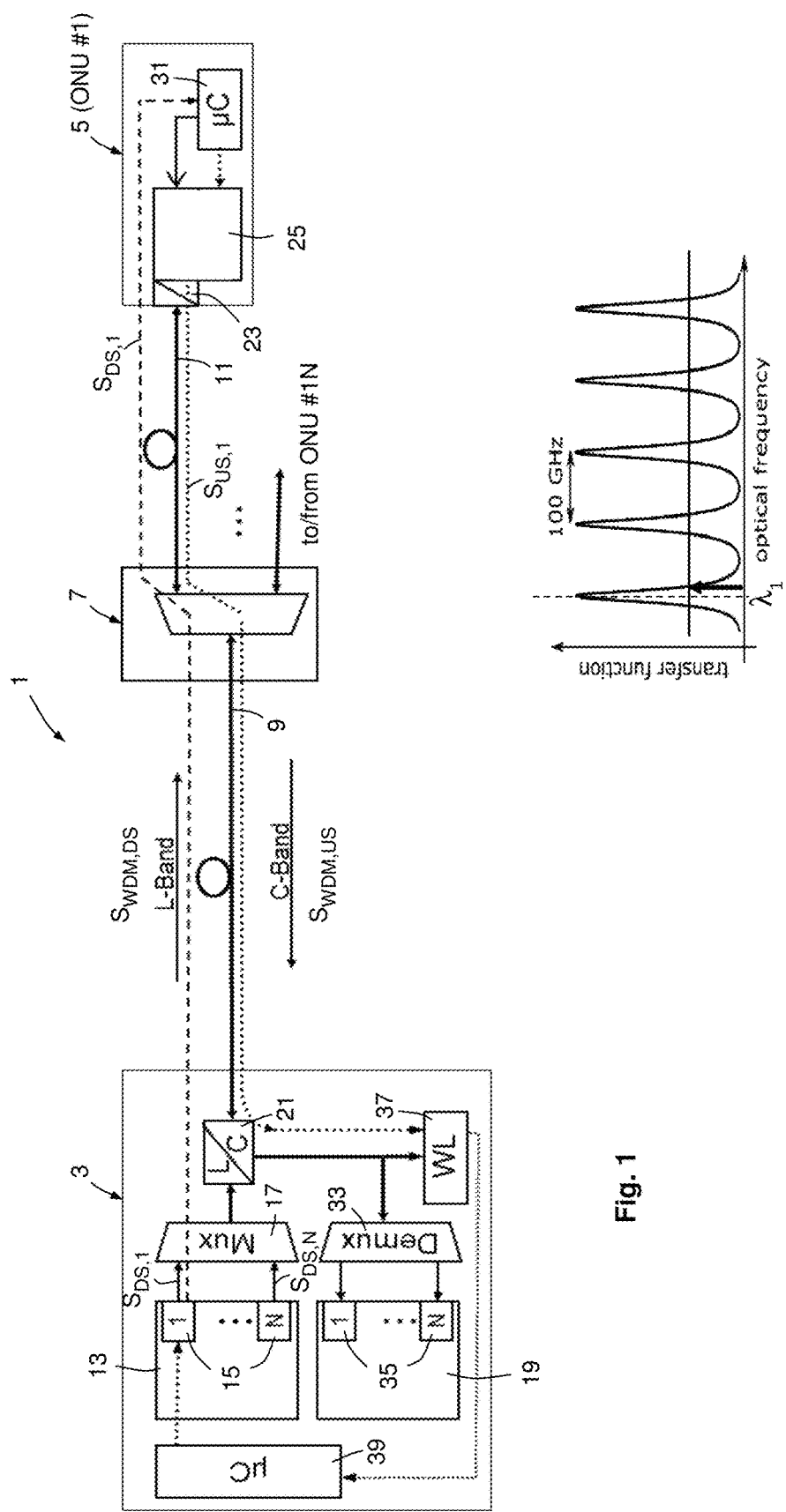

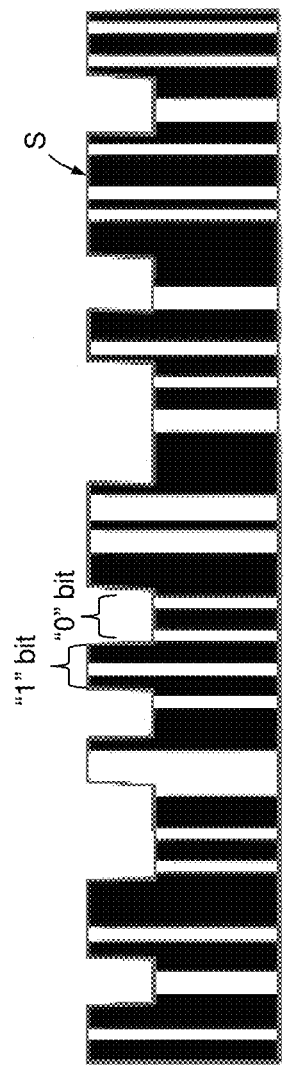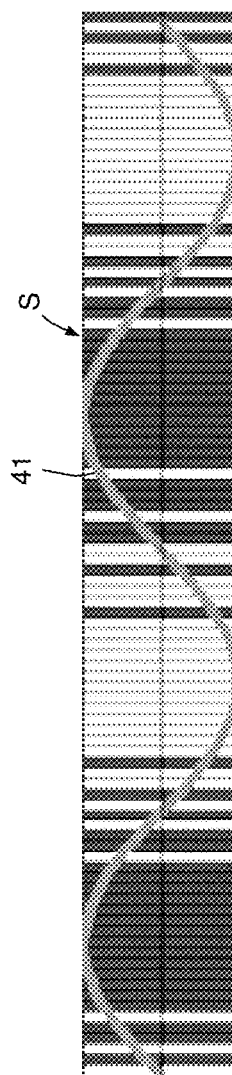
Fig. 3a
Fig. 3b

METHOD AND DEVICE FOR CREATING A CONTROL CHANNEL IN AN OPTICAL TRANSMISSION SIGNAL AND METHOD AND DEVICE FOR EXTRACTING THE INFORMATION INCLUDED THEREIN

CROSS-REFERENCE TO RELATED APPLICATION

This application claims priority to European Patent Application No. 15162994.6 filed Apr. 9, 2015, the disclosure of which is hereby incorporated in its entirety by reference.

BACKGROUND OF THE INVENTION

Field of the Invention

The invention relates to a method for creating a control channel in an optical transmission signal. Further, the invention relates to a device for creating a control channel in an optical transmission signal. Further, the invention relates to corresponding devices for extracting the information in such a control channel of an optical transmission signal.

Description of Related Art

In optical transmission networks, for example a wavelength division multiplex passive optical network (WDM-PON), optical transmission signals are transmitted between a first and a second end of an optical transmission link in order to establish a bidirectional transmission link. In addition to the wanted signal carrying user information, control information must be transported between the ends of the transmission link. Such control information may especially be used in order to tune the wavelength of a tunable optical transmitter in a WDM-PON so that the wavelength of the optical carrier signal created by the tunable optical transmitter corresponds to the center wavelength of the optical WDM channel assigned to the optical transmitter.

A central tuning device has been proposed in EP 2 773 056 which is capable of extracting a tuning information included in an optical transmission signal, which is created by an optical transmitter device at a first or second end of an optical transmission link and included in a control channel of the optical transmission signal, of evaluating the tuning information extracted and of creating a control channel in the optical transmission signal which is transmitted to the respective first or second end of the optical transmission link. This known device or method uses a specific pilot tone frequency which is assigned to the optical transmitter device creating the respective optical transmission signal, wherein the control information is (at least partly) represented by the tone frequency which is modulated onto the wanted signal carrying the user information using simple amplitude modulation. A rather small modulation index is used in order not to deteriorate the signal-to-noise ratio in an inacceptable manner. In this known embodiment of a central tuning device, in which the central tuning device is provided within the WDM path of the WDM-PON, a WDM pilot tone frequency is used for establishing a control channel in each of the optical channel signals that are transmitted to the respective end of the transmission link. The WDM pilot tone is modulated onto the WDM signal, which is transmitted in the respective downstream or upstream direction. In order to transport information in a selected downstream or upstream channel signal the pilot tone can be used as a carrier signal, by applying a digital modulation to this carrier signal.

Thus, in this known method or device an analog amplitude modulation is used in order to create a tuning information in the optical transmission signal, that is the pilot tone, which is digitally modulated if additional digital data are to be included in the control channel. In order to realize such an analog amplitude modulation of an optical signal, additional components are required in an optical transmitter device such as digital-to-analog converters (DAC) or analog-to-digital converters (ADC) or direct digital synthesis (DDS) components. This leads to additional efforts and costs for realizing the hardware that is necessary to establish such a control channel in an optical transmission signal.

SUMMARY OF THE INVENTION

Thus, it is an object of the present invention to provide a method and a device for creating a control channel in an optical transmission signal which do not require additional components in an appropriate optical transmitter device and which can therefore be implemented at low cost. It is a further object of the present invention to provide a method and a device for extracting the information included in such a control channel without the need of additional components in an appropriate optical receiver device.

According to the present invention, a control channel in an optical transmission signal is realized by amplitude-modulating (the power or, more specifically, the average optical power of) an optical carrier signal or a modulated optical carrier signal using a digital modulation scheme only. Thus, no additional hardware is required for creating an analog modulation signal having a predetermined frequency and amplitude. Of course, the optical carrier signal may be a channel signal that is used in a WDM-PON or any other optical network. The invention starts from the finding that a binary digital modulation scheme and a binary digital modulation signal may be used to include the information of an analog pilot tone having a predetermined frequency and amplitude in a control channel of an optical transmission signal. Such a binary digital modulation signal can easily be created by a controller device, which is already present in a transceiver device at a respective end of an optical transmission link. A digital output port of such an already present controller device may be used to output the binary digital modulation signal required to create the control channel.

The control information may, for example, be used to control, at a first or second end of an optical transmission link, one or more optical transmitter devices with respect to the (center) wavelength of the optical signal created or to control one or more wavelength-sensitive receiver devices with respect to the (center) wavelength of an optical signal to be received.

Of course, the binary digital pilot tone signal component may be created by amplitude-modulating an optical carrier signal, which may either be a continuous wave (CW) optical signal or a modulated optical carrier signal, which already comprises a higher frequency modulation component, i.e. information comprised in a user channel. It is of course also possible to create the binary digital pilot tone signal component using direct amplitude modulation of an optical transmitter, that is, supplying an electrical modulation signal to the optical transmitter which causes the optical transmitter to create an optical signal the (average) optical power of which is varied according to the variation of the electrical modulation signal.

According to an embodiment of the invention, the binary digital pilot tone signal component is created by using an amplitude pulse density modulation. A higher value of the density of "1" bits leads to a higher value of the (average) optical power of the optical transmission signal and corresponds to a higher (amplitude) value of the analog representation of the pilot tone signal to be included in the control channel of the optical transmission signal. Likewise, a lower value of the density of "1" bits leads to a lower value of the (average) optical power of the optical transmission signal and corresponds to a lower (amplitude) value of the analog representation of the pilot tone signal to be included in the control channel of the optical transmission signal. If a sinusoidal pilot tone is used, the maximum density of "1" bits corresponds to the maximum of the sine curve and the minimum density of "1" bits corresponds to the minimum of the sine curve.

The pilot tone signal component may be created for a predetermined time interval that is sufficient to enable a device for extracting the information transported in the control channel to determine the frequency and/or the amplitude of the pilot tone according to the binary digital pilot tone signal component.

According to a further embodiment of the invention, the lower frequency modulation component may further comprise a binary digital control signal component, which is created using a binary digital modulation scheme which is preferably identical to the binary modulation scheme for creating the binary digital pilot tone signal component. In this way, exactly the same hardware may be used to create different pieces of information included in the binary digital control signal component, namely, on the one hand, an information corresponding to a pilot tone having a predetermined frequency and amplitude and, on the other hand, a digital control information that is interpreted according to a given code. However, according to the invention, only one type of information is included at the time within the lower frequency modulation component, i.e. either the binary digital pilot tone signal component or the binary digital control signal component.

According to a preferred embodiment, the binary digital pilot tone signal component and the digital control signal component are included in the optical transmission signal by time-division multiplexing. For example, these two types of information or binary digital signal components may be included in a frame having a predefined structure. Each frame may include a predefined digital marker defining the starting point of the frame. This digital marker can be followed by the binary digital pilot tone signal component lasting for a predetermined time interval. This information can be followed by the digital control signal component, which may comprise a predetermined number of words or bytes.

In an advantageous embodiment of the invention, the higher frequency modulation component carrying user information is a high bit rate digital signal, wherein the bit rate of the high bit rate digital signal (i.e. the data bit rate of the user channel) exceeds the bit rate of the binary digital control signal component by such an amount that the cross talk is essentially zero or at least lower than a predetermined threshold, preferably by a factor of at least 100, more preferably by factor of at least 1,000 and most preferably by a factor of at least 10,000.

According to a preferred embodiment of the invention, the bit rate of the pilot tone signal component is created at a constant bit rate, which is chosen in such a way that at least a predetermined number of bits exists per period of the pilot tone, the predetermined number of bits preferably being 10, more preferably 20 and most preferably 25. In other words, each "1" bit and each "0" bit representing the pilot tone have a constant width.

The information concerning the pilot tone, that is, the frequency and the amplitude of the pilot tone, can be extracted from the optical transmission signal by applying an opto-electrical conversion of the signal received at a predetermined location and by applying a Fast Fourier Transform analysis to the electrically converted signal. A wave locker having at least one optical filter may be used in order to analyze the optical (center) wavelength of the optical transmission signal received with respect to a dedicated center wavelength. The dedicated center wavelength may be assigned to an optical channel of a WDM transmission system like a WDM-PON.

Of course, the method according to the invention may be used to create a control channel included in an optical transmission signal which is transmitted from one end of an optical transmission link to a central tuning device and vice versa. If the optical transmission signal is created in an optical network node (for example, an optical network unit (ONU) of a WDM-POM) at an end of an optical transmission link comprising a tunable optical transmitter, the control channel may include the binary digital pilot tone signal component, only. It might not be necessary to further include a control information in the form of a binary digital control signal component that is created according to a predetermined code. However, it is generally possible to additionally include a binary digital control signal component in the control channel for transporting additional information from the optical network node to the network node provided at the opposite end of the transmission link, to any other network node or to a central tuning device.

A device for creating a control channel in an optical transmission signal according to the invention comprises an optical transmitter device and a controller device for controlling the optical transmitter device. The controller device is configured to create a modulation signal supplied to the optical transmitter device in the form of a binary digital modulation signal corresponding to the pilot tone signal. The optical transmitter device is configured to create the lower frequency modulation component of the optical transmission signal in such a way that it comprises a binary digital pilot tone signal component according to the binary digital modulation signal using amplitude modulation.

According to an embodiment of a device according to the invention, the controller device may comprise or may be configured to receive or determine at least one data pattern for creating the binary digital modulation signal in such a way that the binary digital pilot tone signal component corresponds to a predetermined pilot tone frequency and a predetermined amplitude. Of course, such a data pattern may represent a single period of the pilot tone.

As mentioned above, the binary digital modulation signal may be realized as mark density modulation signal component, i.e. the density of "1" bits (represented by a respective high value of the average optical power of the optical transmission signal) corresponds to the amplitude of the pilot tone.

The optical transmitter device may be configured to add the binary digital modulation signal to a data signal comprising the user information to be transported in the higher frequency modulation component and using the resulting sum signal as a modulation signal supplied to an optical transmitter comprised by the optical transmitter device. In other words, direct modulation of an optical transmitter is used, wherein the modulation signal is supplied, as electrical modulation signal, to a modulation port of the optical transmitter. Thus, almost no additional hardware is required (apart from summing up the signals) for establishing the control channel.

According to another embodiment of a device according to the invention, the optical transmitter device may comprise an optical amplifier having a gain port. The binary digital modulation signal can then be supplied to the gain port in order to create the binary digital pilot tone signal component or the binary digital control signal component.

According to the invention, a control device, which is already provided within a given design of an optical transceiver or an optical network node, may be used for establishing the control channel, wherein the controller device realizes the method explained above.

A device for extracting the information transported in a control channel of an optical transmission signal according to the invention is configured to receive the respective optical transmission signal and to convert the signal into an electrical receive signal by means of an optical receiver of an optical receiver device. The optical receiver device further comprises a receiver control unit, which is configured to apply a Fast Fourier Transform analysis onto the electrical receive signal in order to determine the frequency and/or the absolute or relative amplitude of the pilot tone.

BRIEF DESCRIPTION OF THE DRAWINGS

Further objects and advantages of the present invention will become apparent from the following description of the preferred embodiments that are given by way of example with reference to the accompanying drawings, wherein:

FIG. 1 shows a schematic block diagram of a WDM-PON comprising a single OLT and a plurality of ONUs, which are connected to a remote node, the OLT and the ONUs being configured to establish a control channel according to the invention within the respective upstream and downstream optical transmission signals;

FIG. 2 shows a diagram of the transfer function of an etalon included in the wave locker, which is comprised in the OLT of the WDM-PON in FIG. 1;

FIG. 3a shows a schematic diagram of the optical transmission signal including a binary digital control signal component in the control channel of an upstream or downstream optical transmission signal;

FIG. 3b shows a schematic diagram of the optical transmission signal including a binary digital pilot tone signal component;

DETAILED DESCRIPTION OF THE INVENTION

Figure 4:
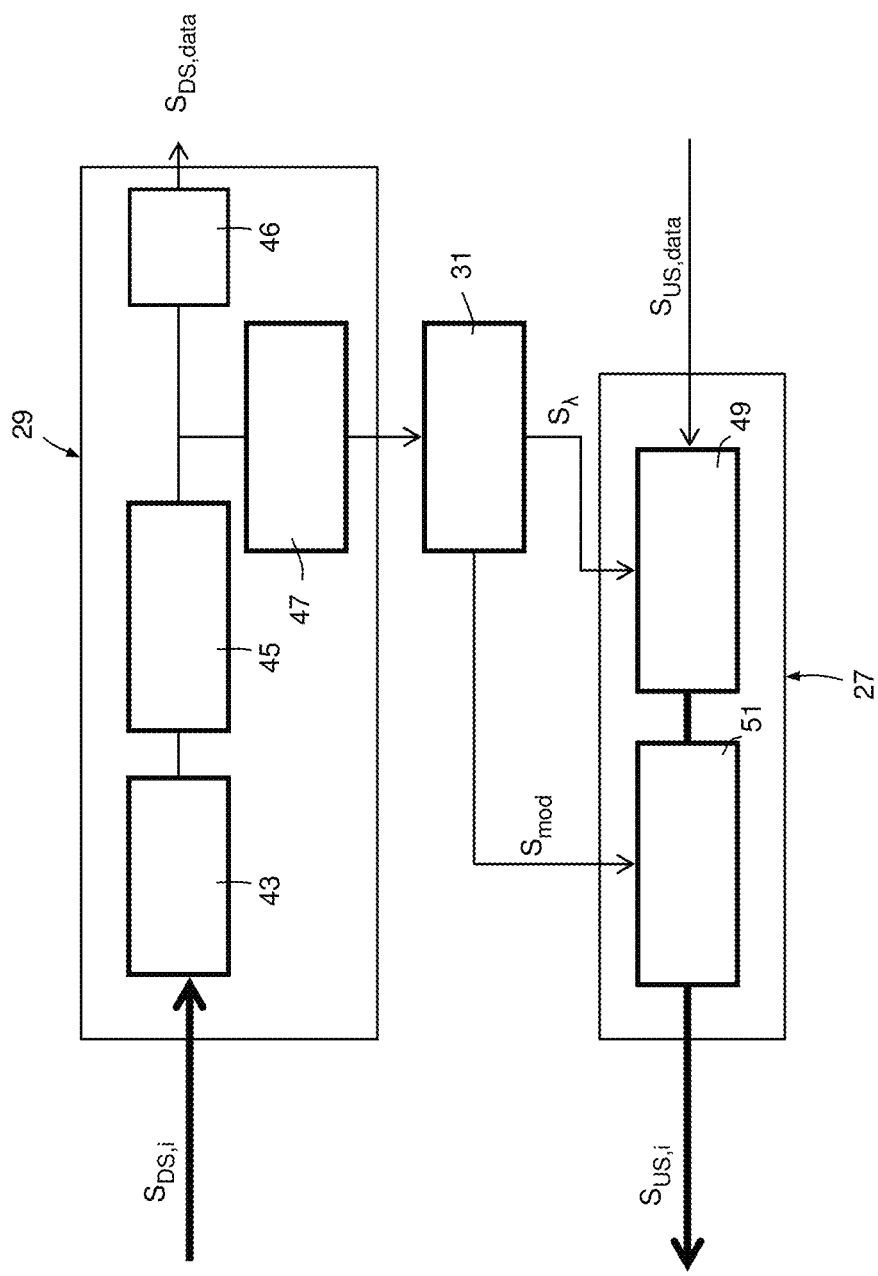
FIG. 4 shows a more detailed schematic block diagram of an ONU as used in FIG. 1.

FIG. 1 shows a WDM-PON 1 comprising at a head-end side an OLT 3 and at the tail-end side a plurality of ONUs 5. In the embodiment shown in FIG. 1, the OLT 3 and the ONUs 5 are connected to a remote node 7 using single-fiber working, i.e. a single optical fiber is used for connecting the respective node at the head end or tail end to the remote node 7. However, it would of course also be possible to use dual-fiber working for these connections, i.e. separate fibers for the downstream direction from the OLT 3 to the remote node 7 and/or from the remote node 7 to the respective ONU 5 and for the upstream direction from each of the ONUs 5 to the remote node 7 and/or from the remote node 7 to the OLT 3 may be used.

According to the embodiment shown in FIG. 1, an optical feeder fiber 9 is used for connecting an input/output port of the OLT 3 to a WDM port of the remote node 7. Likewise, each input/output port of an ONU 5 is connected to a dedicated channel port of the remote node 7 by a single optical distribution fiber 11.

The OLT comprises an optical transmitter array 13, which includes N optical transmitter devices 15 configured to create a respective optical downstream channel signal $S_{DS,i}$ ($1 \leq i \leq N$). These optical downstream channel signals are multiplexed by an optical multiplexer 17 into an optical downstream WDM signal $S_{WDM,DS}$ which is supplied to a first band port of an optical diplexer 21. A common port of an the optical diplexer 21, which also defines the input/output port of the OLT 3, supplies the optical downstream WDM signal $S_{WDM,DS}$ to the respective end of the optical feeder fiber 9.

The optical downstream WDM signal is supplied to the WDM port of the remote node 7, which may be realized by a 1×N arrayed waveguide grating (AWG) and demultiplexed into the single optical downstream channel signals $S_{DS,1}$ to $S_{DS,N}$, which are output at the channel ports of the remote node 7 or the AWG, respectively. The optical downstream channel signal $S_{DS,i}$ is supplied to the respective input/output port of the respective ONU 5.

Each ONU 5 comprises an optical diplexer 23 having a common port, which defines the respective input/output port of the ONU 5. The ONU 5 further comprises an optical transceiver 25 including an optical transmitter device 27 and an optical receiver device 29 (FIG. 4; FIG. 5) and a controller device 31. The output port of the optical transmitter device 27 is connected to a first band port of the optical diplexer 23 and the input port of the optical receiver device 29 is connected to a second band port of the optical diplexer 23. The optical diplexer 23 serves to separate and combine the input and output paths of the optical downstream channel signal $S_{DS,i}$ and a respective optical upstream channel signal $S_{US,i}$ ($1 \leq i \leq N$), which is created by the optical transmitter device 27 of the ONU 5. Of course, the optical diplexer 23 can be omitted if dual-fiber working is used for connecting the ONUs 5 to the remote node 7.

If single-fiber working is used for the optical paths between the OLT 3, the remote node 7 and the ONUs 5, different optical wavelength bands must be used for the downstream and upstream directions in order to make it possible to use simple optical diplexers 21 and 23 in the OLT 3 and ONUs 5 for separating the downstream and upstream paths of the respective downstream and optical upstream channel signals. As apparent from the embodiment shown in FIG. 1, the optical L-band is used for the downstream direction, i.e. for the optical downstream channel signals $S_{DS,i}$ to $S_{DS,N}$, and the optical C-band is used for the upstream direction, i.e. for the optical upstream channel signals $S_{US,1}$ to $S_{US,N}$. As shown in FIG. 1, a single cyclic AWG may be used even if different optical bands are used for the downstream and upstream directions.

In the embodiment shown in FIG. 1, the optical transmitter device 27 is a tunable optical transmitter device, i.e. the controller device 31 is configured to control the optical transmitter device 27 with respect to the center wavelength $\lambda_i$ ($1 \leq i \leq N$) of the optical upstream channel signal $S_{US,i}$. That is, the controller device 31 controls the optical transmitter device 27 of an ONU 5 in such a way that the center wavelength of the respective optical transmission signal corresponds to the center wavelength of a respective optical WDM channel that is dedicated to the respective transmission links between the OLT 3 and the ONU 5. Generally, this optical channel is defined by the remote node 7 and the routing properties of the respective AWG.

It is to be noted that, within this description, any optical downstream channel signal $S_{DS,i}$ and any optical upstream channel signal $S_{US,i}$ is generally referred to as optical transmission signal S.

The OLT 3 further comprises an optical demultiplexer 33 having a WDM port, which is connected to a second band port of the optical diplexer 21. The optical demultiplexer 33 has N channel ports, each of which is connected to an input port of an optical receiver device 35 of an optical receiver array 19. Further, the OLT 3 comprises a wave locker 37 serving as a central wavelength tuning device. A control port of the wave locker 37 is connected to a controller device 39 of the OLT 3. The controller device 39 is configured to process all major calculation and control actions that are necessary in the OLT 3.

As apparent from FIG. 1, the upstream optical WDM signal $S_{WDM,US}$, which comprises all existing optical upstream channel signals $S_{US,i}$, is also supplied to an input port of the wave locker 37. The wave locker may comprise at least one optical comb-filter, e.g. an etalon, which is used for determining the wavelength position of the center wavelengths of the optical upstream channel signals $S_{US,i}$. As the design and function of a wavelength locker is well known, this shall not be explained in further detail. Anyway, the type of wavelength locker used in connection with the present invention evaluates a pilot tone of a predetermined lower frequency, wherein a characteristic predetermined pilot tone frequency $f_i$ may be assigned to each ONU 5. The wavelength locker 37 is configured to extract the pilot tone (having the pilot tone frequency $f_i$) from the respective optical upstream channel signal $S_{US,i}$, which is included therein as an amplitude-modulation component. Thus, the wave locker 37 may extract the pilot tone information of a desired optical upstream channel signal $S_{US,i}$ by opto-electrically converting the comb-filtered optical upstream WDM signal $S_{WDM,US}$ and further narrow-band filtering the respective electrical signal, wherein the narrow band of the band filter comprises the known frequency $f_i$ of the pilot tone included in the respective upstream channel signal $S_{US,i}$.

More particularly, the wave locker 37 may vary the band of the narrow-band filter so that the pilot tone frequencies $f_1$ to $f_N$ are scanned, wherein the wave locker 37 determines the actual amplitude of the pilot tones received. The amplitude of the pilot tone received can be used to determine the accuracy of the position of the center wavelength of the upstream channel signal $S_{US,i}$, to which a specific pilot tone frequency $f_i$ has been assigned.

FIG. 2 shows the transfer function, i.e. the filter function of an etalon comprised by the wave locker 37, which is a typical comb-filter function. The transfer function of this etalon reveals an optical frequency separation of 100 GHz between the maxima of the filter transfer function. This frequency separation corresponds to the frequency separation of the optical channels used in the WDM-PON according to FIG. 1. If the wave locker etalon has a transfer function that is shifted versus the WDM channel grid of the PON by a predetermined value, e.g. by 50 GHz, already small variations of the center wavelength of the respective upstream channel signal $S_{US,i}$, lead to high variations of the respective pilot tone amplitude detected by the wave locker 37. In this way, the position of the center wavelength of the respective upstream channel signal $S_{US,i}$ can be controlled to the desired wavelength position with high precision. The vertical arrow in FIG. 2 designates the optimum optical frequency (wavelength) of the optical upstream channel signal $S_{US,1}$, i.e. the center wavelength of the optical channel assigned to the first ONU 5 (ONU #1, which is explicitly shown in FIG. 1). As the amplitude of the pilot tone, which is included in the respective upstream channel signal $S_{US,1}$ and the amplitude of the optical power of the optical upstream channel signal $S_{US,1}$ are equally attenuated by the etalon depending on the exact actual value of the (center) wavelength of the optical upstream channel signal $S_{US,1}$, the amplitude of the pilot tone can be evaluated as a measure of the actual position of the (center) wavelength or its deviation from the desired optimum position (defined by the center wavelength of the respective WDM channel). For this purpose, the wave locker 37 may be configured to know an optimum (absolute or relative) value of the pilot tone amplitude which is reached when the optimum position of the (center) wavelength of the optical upstream channel signal $S_{US,1}$, (or generally the optical upstream channel signal $S_{US,i}$) is reached. This optimum value of the pilot tone amplitude corresponds to a predetermined value of the etalon transfer function, which is shown in FIG. 2 as a horizontal line.

Of course, the wave locker 37 may apply a digital filtering method, e.g. based on a Fast Fourier Transform analysis, in order to determine which (known) pilot tones are present in the upstream WDM signal received. As already mentioned, if a unique pilot tone is assigned to each ONU 5, this information may be used to transport the information concerning the amplitude of the pilot tone received to the ONU 5 which has created the respective optical upstream channel signal $S_{US,i}$.

According to the design of the OLT 3 of the WDM-PON 1 in FIG. 1, the wave locker 37 supplies the information concerning the amplitude of the one or more pilot tone frequencies $f_i$ of the pilot tones included in the optical WDM to the controller device 39. The controller device 39 uses this information to determine a control information which is to be transmitted to the respective ONU 5. The control information may, for example, comprise the information in which wavelength direction and to what extent the tunable optical transmitter device should change the wavelength of the respective optical upstream channel signal $S_{US,i}$, so as to match the center wavelength of the optical channel assigned to this ONU 5. Of course, any other type of information may be transmitted to a selected ONU by the OLT 3. For this purpose, the control unit 39 may supply an appropriate control signal to any of the optical transmitter devices 15.

The control information that is transmitted from the OLT 3 to a selected ONU 5 may be integrated; as a binary digital control signal component, in the respective optical downstream channel signal $S_{DS,i}$ as a lower frequency amplitude-modulation component, i.e. the average power of this optical transmission signal varies according to a binary digital amplitude modulation scheme.

Of course, a pilot tone information may be included in each of the downstream channel signals $S_{DS,i}$, too. This information may be used to control the wavelengths of the optical downstream channel signals. For this purpose, a small portion of the optical power of the optical downstream WDM signal may be tapped off and supplied to the wave locker 37 or an additional wave locker.

FIG. 3a shows a schematic representation of an optical transmission signal S, which may be created as an optical upstream channel signal $S_{US,i}$ or an optical downstream channel signal $S_{DS,i}$. As explained above, any type of control information may be included as a binary digital control signal component in such an optical transmission signal S by over-modulating a wanted optical signal, which may already carry user information in a higher frequency modulation component. Of course, any type of modulation may be used to integrate the user information (or user data) into the optical transmission signal S. A binary digital amplitude modulation scheme is used to integrate the control information into the optical transmission signal S. Of course, a relatively small modulation index or modulation depth should be used in order not to deteriorate the signal-to-noise ratio of the optical transmission signal S with respect to the higher frequency modulation component, i.e. the user information or user data.

Of course, the bit rate of the binary digital control signal component should be low as compared to the bit rate of the higher frequency modulation component or the user data, respectively. As an example, the bit rate for the user data may be 10 Gbit/s and the bit rate of the binary digital control signal component may be as low as 100 kbit/s. In FIG. 3a, the black portions of the optical transmission signal S correspond to "1" bits of the digital data signal included in the optical transmission signal S and the white portions of the optical transmission signal S correspond to "0" bits of the digital data signal. However, it is of course not necessary that a binary digital amplitude modulation is used for the data signal integration. As already mentioned above, any type of modulation can be used for the integration of the data signal component into the optical transmission signal S.

In order to reduce the effort for integrating the desired pilot tone signal into the respective optical transmission signal S, a digital representation of the pilot tone signal is used in the ONUs 5 and/or the OLT 3 of the WDM-PON 1 in FIG. 1.

As shown in FIG. 3b, a pulse density modulation may be used in order to integrate a pilot tone information into an optical transmission signal S. The sine curve 41 in FIG. 3b shows the pilot tone corresponding to the pulse density of "1" bits (the shaded bits in FIG. 3b). The higher the density of "1" bits is, the higher is the corresponding value of the amplitude of the respective pilot tone signal having a given tone frequency $f_i$. Of course, the representation in FIG. 3b shows the upper portion of the optical transmission signal, i.e. the amplitude range influenced by the amplitude modulation only. Again, a rather small modulation index should be used for the same reason. The constant bit rate that is used for the integration of the pilot tone information into the optical transmission signal S should be relatively high as compared to the pilot tone frequency $f_i$. Typically, 25 bits per period of the pilot tone should be present in order to guarantee a sufficiently exact representation of the pilot tone within the optical transmission signal S.

Of course, the bit rate for integrating the pilot tone information as a binary digital pilot tone signal component into the optical transmission signal S may be the same as is used for integrating the (digital) control information. If a bit rate of 100 Kbit/s is used for the transmission of the digital control information a pilot tone frequency of $f_t=4$ kHz corresponds to 25 bits per period of the pilot tone frequency, which is a reasonable value in order to effect the wavelength control.

Figure 5:
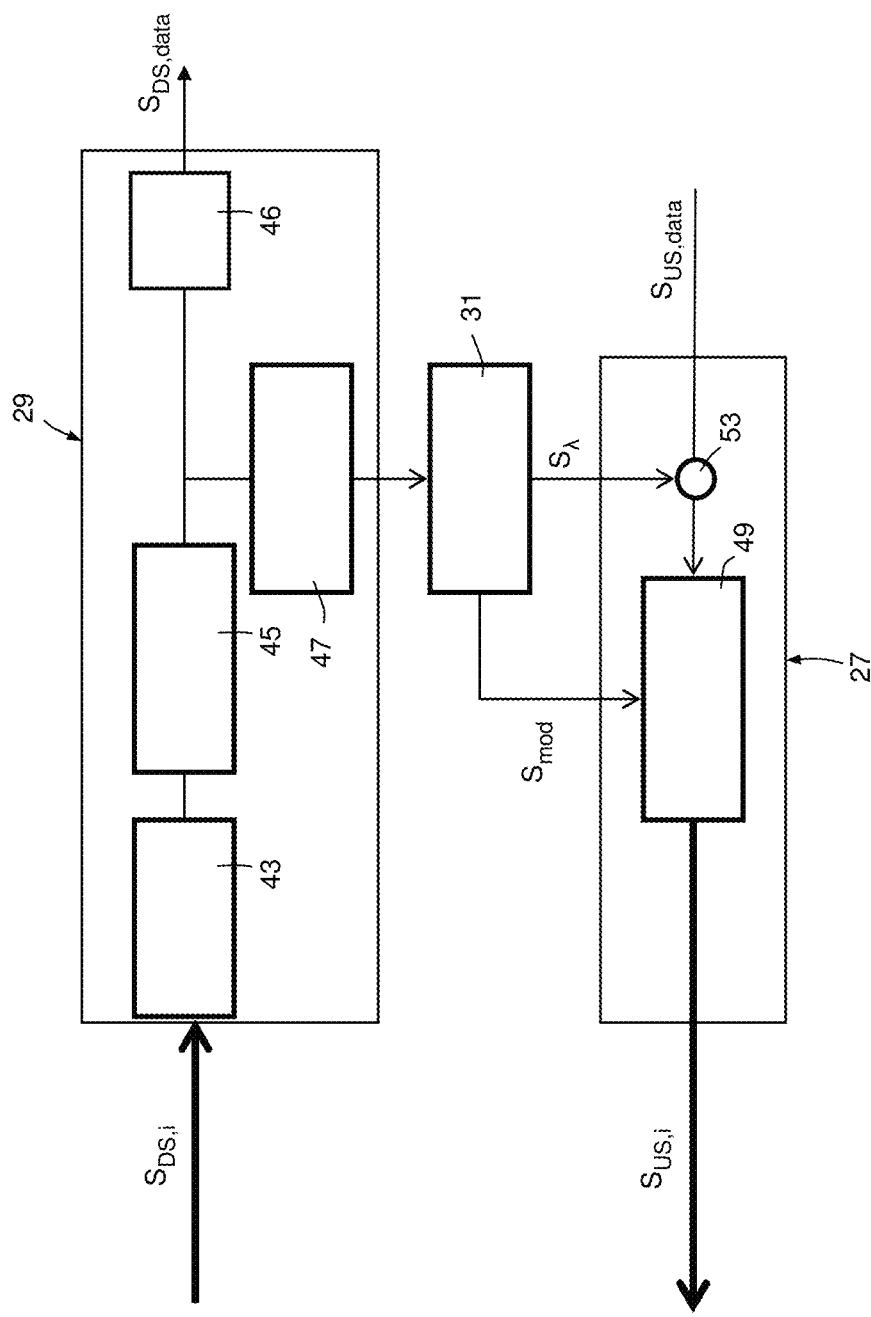
FIG. 5 shows a further embodiment of an ONU similar to FIG. 4.

FIG. 4 shows a schematic block diagram of an ONU 5 apart from the optical diplexer 23 (see FIG. 1). An optical downstream channel signal $S_{DS,i}$ is supplied (from the respective band port of the optical diplexer 23) to an input port of the optical receiver device 29, which is defined by an input port of an optical receiver 43. The optical receiver 43 converts the optical downstream channel signal $S_{DS,i}$ into an electrical signal and supplies this converted signal to an amplifier 45. The optical amplifier outputs the electrical receive signal at an output port. Of course, before outputting this signal as a downstream user data signal $S_{DS,data}$, a signal recovery is be effected by a signal recovery unit 46.

The converted electrical signal received is also supplied to a low-pass filter 47, which may be realized as digital or analog filter. The low-frequency component, which corresponds to the lower-frequency modulation component that was included in the optical downstream channel signal $S_{DS,i}$ received, is a binary digital signal corresponding to the binary digital modulation component shown in FIG. 3a. This binary digital signal is supplied to the controller 31, which extracts and processes the information included in this digital signal. According to this information, the controller 31 creates a wavelength control signal SA, which is supplied to the tunable optical transmitter 49 included in the optical transmitter device 27. The wavelength control signal SA is created in such a manner that the tunable optical transmitter 49 creates an optical upstream channel signal $S_{US,i}$, at a predetermined wavelength.

Further, the control unit 31 may be configured to create a modulation signal $S_{mod}$, which is supplied to a modulation port of an optical amplifier 51. The optical amplifier 51 receives the optical signal created by the tunable optical transmitter 41, which already includes, as higher frequency modulation component, user information according to an upstream user data signal $S_{US,data}$. In general, direct modulation of a tunable laser is used to create the optical upstream signal including the user data information. This optical upstream signal is supplied to an input port of the optical amplifier 51, which is used as an optical modulator modulating the average power of the upstream signal received according to the modulation signal $S_{mod}$ supplied to the modulation port. As a result, an optical upstream channel signal $S_{US,i}$, is created comprising, as a higher-frequency modulation component defining the user channel, the user information according to the upstream user data signal $S_{US,data}$ and, as a lower-frequency modulation component defining the control channel, a digital control information or a digital pilot tone information. Both the pilot tone information (included in a binary digital pilot tone signal component) and the digital control information (included in a binary digital control signal component) are integrated into the optical transmission signal (here, the optical upstream channel signal) by an optical amplitude modulation of the (average) optical power of an optical signal, which already includes, as a higher-frequency modulation component, the user data information that is to be transmitted to the OLT 3.

The schematic block diagram of the main portion of an ONU 5 shown in FIG. 5 is essentially identical with the block diagram in FIG. 4 apart from the design of the optical transmitter 27. The optical transmitter 27 in FIG. 5 does not comprise an optical amplifier. In order to integrate the control information into the optical upstream channel signal $S_{US,i}$, the modulation signal created by the controller device 31 is added to the upstream user data signal $S_{US,data}$ by an adding means 53. Thus, the sum of both signals is used as a modulation signal in order to effect a direct modulation of the tunable optical transmitter 49.

Both alternatives do not require any additional components for creating a user channel in an optical transmission signal as a simple binary digital amplitude modulation is used for both integrating pilot tone information and integrating digital control information into the optical transmission signal.

Of course, the two types of control information shall not be present at a time as the digital control information would influence the desired density of "1" bits for representing a desired pilot tone.

As already mentioned above, an optical transmission signal created by a tunable optical transmitter device and transmitted to a wavelength tuning device may include a pilot tone information in the control channel only. The optical transmission signal transmitted to this tunable optical transmitter may include a digital control information in the control channel only. It is, however, also possible that both types of control information are included in the control channel in the optical transmission signal transmitted to the wavelength tuning device. Finally, the optical transmission signal transmitted to the tunable optical transmitter device may include both types of control information in the control channel, too.

As explained above, the extraction of the pilot tone information included in the density modulation component of "1" bits can easily be effected by low-pass filtering or band-pass filtering the optical transmission signal. Either analog or digital optical filtering may be applied.

The digital control information may be included in the control channel in the form of data packets, which may also have a frame structure. The data packets which include control information may be preceded by a distinct pattern to enable packet synchronization.

The binary digital density representation of a pilot tone may be effected using known methods, preferably a delta-sigma modulation. The binary digital data stream required to generate a distinct pilot tone may be pre-calculated and stored in the controller device 31. Of course, it is also possible to transmit this information, i.e. the binary digital data stream necessary to represent a desired pilot tone of a given frequency, to the respective ONU 5 or the controller device 31 from a higher-instant processing means or another network node using the control channel.

It is also possible to generate the binary digital data stream required to generate a distinct pilot tone using an appropriate calculation means, for example a delta-sigma modulator. This alternative is especially advantageous in embodiments in which the pilot tone frequency to be used may vary or is transmitted to the respective network node upon request or during an initialization procedure. It is of course also possible to store a plurality of different digital data streams each representing a distinct pilot tone frequency.

LIST OF REFERENCE SIGNS

1 WDM-PON
3 OLT
5 ONU
7 remote node
9 optical feeder fiber
11 optical distribution fiber
13 optical transmitter array
15 optical transmitter device
17 optical multiplexer
19 optical receiver array
21 optical diplexer
23 optical diplexer
25 optical transceiver device
27 optical transmitter device
29 optical receiver device
31 controller device
33 optical demultiplexer
35 optical receiver device
37 wave locker
39 controller device
41 sine curve of pilot tone
43 optical receiver
45 amplifier
46 signal recovery unit
47 low-pass filter
49 (tunable) optical transmitter
51 optical amplifier
$S_{WDM,DS}$ optical downstream WDM signal
$S_{WDM,US}$ optical upstream WDM signal
$S_{DS,i}$ optical downstream channel signal
$S_{US,i}$ optical upstream channel signal
$S$ optical transmission signal
$S_{US,data}$ upstream user data signal
$S_{DS,data}$ downstream user data signal
$S_{mod}$ modulation signal
$f_t$ pilot tone frequency

The invention claimed is:

1. A method for creating a control channel in an optical transmission signal,
    (a) wherein the optical transmission signal comprises an optical carrier frequency component, a higher frequency modulation component carrying user information to be transported from a first end to a second end of an optical transmission link and a lower frequency modulation component carrying control information, the higher frequency modulation component realizing a user channel and the lower frequency modulation component realizing the control channel,
    (b) wherein the lower frequency modulation component is created by amplitude modulation, and
    (c) wherein the lower frequency modulation component is created by using a binary digital modulation scheme and a binary digital modulation signal in such a way that the lower frequency modulation component comprises a binary digital pilot tone signal component corresponding to a pilot tone signal having a predetermined pilot tone frequency.

2. The method according to claim 1, comprising creating the binary digital pilot tone signal component by an amplitude pulse density modulation.

3. The method according to claim 1, comprising creating the pilot tone signal component is created for a predetermined time interval.

4. The method according to claim 1, wherein the lower frequency modulation component further comprises a binary digital control signal component using a binary digital modulation scheme.

5. The method according to claim 4, wherein the binary digital pilot tone signal component and the binary digital control signal component are time-division multiplexed.

6. The method according to claim 1, wherein the higher frequency modulation component carrying user information is a high bit-rate digital signal, wherein the bit rate of the high bit rate digital signals exceeds the bit rate of a binary digital control signal component by such an amount that the cross talk is essentially zero or at least lower than a predetermined threshold.

7. The method according to claim 1, comprising creating the pilot tone signal component at a constant bit rate, which is chosen in such a way that at least a predetermined number of bits exists per period of the pilot tone.

8. A method for extracting information transported in a control channel of an optical transmission signal according to claim 1, comprising receiving and converting the optical transmission signal into an electrical transmission signal and applying a Fast Fourier Transform analysis to extract the frequency and/or the absolute or relative amplitude of the pilot tone.

9. A device for creating a control channel in an optical transmission signal, comprising an optical transmitter device and a controller device configured to control the optical transmitter device, wherein the controller device is configured to create a modulation signal supplied to the optical transmitter device, and wherein the optical transmitter device is configured to create an optical transmission signal comprising an optical carrier frequency component, a higher frequency modulation component carrying user information to be transported from a first end of an optical transmission link to a second end of an optical transmission link and a lower frequency modulation component carrying control information, the higher frequency modulation component realizing a user channel and the lower frequency modulation component realizing a control channel, and wherein that the controller device is configured to create the modulation signal in the form of a binary digital modulation signal using a binary digital modulation scheme and wherein that the optical transmitter device is configured to create the lower frequency modulation component according to the binary digital modulation signal by amplitude-modulating an optical carrier signal or a modulated optical carrier signal, and, wherein the controller device and the optical transmitter device are configured in such a way, that the lower frequency modulation component is created in such a way that the lower frequency modulation component comprises a binary digital pilot tone signal component corresponding to a pilot tone signal having a predetermined pilot tone frequency.

10. The device according to claim 9, wherein the controller comprises or is configured to receive or determine at least one data pattern for creating the binary digital modulation signal in such a way that the binary digital pilot tone signal component corresponds to a predetermined pilot tone frequency.

11. The device according to claim 9, wherein the binary digital modulation signal component is a pulse density modulation signal.

12. The device according to claim 9, wherein the optical transmitter device is configured to add the binary digital modulation signal to a data signal comprising the user information to be transported in the higher frequency modulation component and using the resulting sum signal as a modulation signal supplied to an optical transmitter comprised by the optical transmitter device.

13. The device according to claim 9, wherein the optical transmitter device comprises an optical amplifier and that the binary digital modulation signal is supplied to a gain port of the optical amplifier for creating the binary digital pilot tone signal component or a binary digital control signal component.

14. The device according to claim 9, wherein the control device is configured to create the modulation signal in such a way that the control channel is established.

15. A device for extracting the information transported in a control channel of an optical transmission signal, wherein the optical transmission signal comprises an optical carrier frequency component, a higher frequency modulation component carrying user information to be transported from a first end to a second end of an optical transmission link and a lower frequency modulation component carrying control information, the higher frequency modulation component realizing a user channel and the lower frequency modulation component realizing the control channel, wherein the lower frequency modulation component is created by amplitude modulation, wherein the lower frequency modulation component is created using a binary digital modulation scheme and a binary digital modulation signal in such a way that the lower frequency modulation component comprises a binary digital pilot tone signal component corresponding to a pilot tone signal having a predetermined pilot tone frequency, and, wherein the optical transmission signal is received and converted into an electrical receive signal by an optical receiver of an optical receiver device and that a Fast Fourier Transform analysis is applied onto the electrical receive signal by a receiver control unit of the optical receiver device in order to determine the frequency and/or the absolute or relative amplitude of the pilot tone.

16. The method according to claim 4, wherein the lower frequency modulation component further comprises a binary digital control signal component using a binary digital modulation scheme identical to a binary modulation scheme for creating the binary digital pilot tone signal component.

17. The method according to claim 7, wherein the predetermined number of bits is 10.

18. The method according to claim 7, wherein the predetermined number of bits is 25.

19. The method according to claim 6, wherein the cross talk is at least lower than the predetermined threshold by a factor of at least 100.

20. The method according to claim 6, wherein the cross talk is at least lower than the predetermined threshold by a factor of at least 10,000.

* * * * *